US012734796B2

(12) United States Patent
Sambri

(10) Patent No.: US 12,734,796 B2
(45) Date of Patent: Sep. 15, 2026

(54) MACHINE FOR THE FLAT MOUNTING OF FLEXOGRAPHIC PRINTING PLATES

(71) Applicant: Bieffebi S.r.l., Granarolo dell'Emilia (IT)

(72) Inventor: Lorenzo Sambri, San Lazzaro di Savena (IT)

(73) Assignee: BIEFFEBI S.R.L., Granarolo dell'Emilia (IT)

(*) Notice: Subject to any disclaimer, the term of this patent is extended or adjusted under 35 U.S.C. 154(b) by 10 days.

(21) Appl. No.: 19/066,818

(22) Filed: Feb. 28, 2025

(65) Prior Publication Data

US 2025/0269640 A1 Aug. 28, 2025

(30) Foreign Application Priority Data

Feb. 28, 2024 (IT) ........................ 102024000004369

(51) Int. Cl.
*B41F 27/08* (2006.01)
*B41F 27/12* (2006.01)

(52) U.S. Cl.
CPC .......... *B41F 27/08* (2013.01); *B41F 27/1212* (2013.01)

(58) Field of Classification Search
CPC ............................. B41F 27/08; B41F 27/1212
See application file for complete search history.

(56) References Cited

U.S. PATENT DOCUMENTS

2013/0171351 A1* 7/2013 Vekstein .................. H05K 3/00 118/712

FOREIGN PATENT DOCUMENTS

| | | | | |
|---|---|---|---|---|
| DE | 3234969 A1 * | 6/1983 | ........... | B25B 11/005 |
| GB | 2057956 A * | 4/1981 | ............. | B26D 7/018 |
| GB | 2490029 A * | 10/2012 | .......... | B41F 27/1275 |
| JP | 59148665 A * | 8/1984 | ............ | B41F 27/005 |

* cited by examiner

*Primary Examiner* — Christopher E Mahoney
*Assistant Examiner* — Marissa Ferguson-Samreth
(74) *Attorney, Agent, or Firm* — Tutunjian & Bitetto, P.C.

(57) ABSTRACT

A machine for flat mounting of flexographic printing plates, comprising a base, a table, supported by said base, defining a support surface for mounting a printing plate on a respective support. The table comprises a front side, a rear side and two opposing sides. The machine also comprises parallel lateral guides, provided along the sides of the table, a carriage slidingly engaged in the lateral guides, a pressure roller associated with the carriage, to determine the adhesion of the printing plate on the respective support, and a vacuum generation system, to constrain the support to the surface of the table, during mounting of the printing plate. The machine comprises at least one layer of fabric, or breathable material, positioned on the surface of the table, on the upper surface of which the support is intended to be positioned, for the subsequent mounting, on it, of the printing plate.

10 Claims, 5 Drawing Sheets

MACHINE FOR THE FLAT MOUNTING OF FLEXOGRAPHIC PRINTING PLATES

TECHNICAL FIELD OF THE INVENTION

The present invention concerns a machine for the flat mounting of flexographic printing plates.

More specifically, the present invention relates to a machine for flat mounting of flexographic printing plates on Mylar supports, particularly, but not exclusively, for the corrugated cardboard industry, or the like.

BACKGROUND ART

The plates for flexographic printing are mounted on their respective supports using special mounting machines.

In more detail, these machines allow the precise application, in relation to specific position references, of a flexographic printing plate onto a sheet of double-sided adhesive material, which in turn adheres to the surface of the support (usually made of Mylar).

In some applications, this support can be flat and flexible (also called a sleeve, in the industry), to be applied in turn—together with the printing plate applied on it—to a printing cylinder, or similar.

The known type of machines usually include one or more cameras that frame the support on which the printing plate is to be mounted from above; usually, there are two cameras, as there are two position references that are used for mounting.

The cameras are, in turn, connected to at least one monitor that allows you to view, enlarged, the areas in which the visual comparison must be made between the references (called, in jargon, crosses or microdots), present on the printing plate, and the crosses on the camera monitors, to obtain the correct assembly.

Traditionally, the mounting of the printing plate on the respective support, with the aid of the aforementioned system of cameras and display monitors, is carried out completely manually.

Machines of this type include a support surface, also called a table, on which the operator manually makes small movements of the cliché with respect to the support in order to find, with the aid of cameras, the correct alignment between the references of the camera crosses and the cliché.

Once the correct alignment has been achieved—verified by the cameras—the printing plate is then made to adhere completely to the support (by interposing, as mentioned, a sheet of double-sided tape), using a pressure roller, supported by a rotating carriage on parallel guides, which run along the sides of the aforementioned table; this carriage also supports the cameras on one of its sides.

The action of the pressure roller exerted on the surface of the printing plate also advantageously allows for the elimination of any air bubbles trapped between the printing plate and the support.

Usually, during the application of the printing plate, the respective support is kept still on the mounting surface by means of a vacuum generation system, comprising a distribution of holes on the surface itself, which holds the support, so that it remains adhered to the surface of the table.

Referring—by way of a non-limiting example—to the corrugated cardboard industry, it is highlighted that there are, on the market, supports of thicknesses that are also quite different from each other (which typically change in relation to the different geographical areas).

For example, in Europe, supports of a significantly lower thickness are used than those used in the American market.

When using thicker substrates, it is observed that the vacuum generation system often proves ineffective, in the sense that it is unable to keep the substrate firmly in place during the application and fixing of the printing plate.

This is due to the fact that thicker supports are normally also more rigid, and the pressure difference—determined by the vacuum generation system—between the upper and lower surfaces of the same is not sufficient to counteract their elasticity. In more detail, once the printing plate has been fixed on the respective support, the movement of the pressure roller—which, as mentioned, must improve the adhesion of the printing plate itself by eliminating any air bubbles—can accidentally cause the support to detach from the support surface, precisely because the vacuum generation system—which is usually sized to operate with supports of a lower thickness—is unable to keep the support itself adhered.

To overcome this annoying drawback, the only solution known to date is to increase the performance of the vacuum generation system, so that the pressure difference between the upper surface of the support and the lower one is sufficient to overcome the elastic reaction of the support itself, which tends to maintain its assumed configuration at rest.

However, in many situations, especially but not only for reasons of installation and operating costs, it is not possible to modify or replace the vacuum generation system of the plate mounting machine.

AIMS OF THE INVENTION

The technical aim of the present invention is therefore to improve the state of the art in the field of flexographic printing plate mounting machines.

Within such technical aim, it is an object of the present invention to develop a flexographic printing plate mounting machine which allows the previously mentioned drawback to be overcome.

Another aim of the present invention is to provide a flexographic printing plate mounting machine that allows the correct and effective mounting of plates even on thicker supports.

This aim and these objects are all achieved by the machine for the flat mounting of flexographic printing plates according to the attached claim 1.

The machine comprises a base and a table, supported by the base, defining a support surface for mounting a printing plate on a respective support.

The table comprises a front side, a back side and two opposing sides.

The machine also includes parallel lateral guides, provided along the sides of the table, a carriage slidingly engaged in the lateral guides, and a pressure roller associated with the carriage, to determine the adhesion of the printing plate on the respective support.

The machine also includes a vacuum generation system, to secure the support to the table surface during plate mounting.

According to the invention, the machine comprises at least one layer of fabric or breathable material, positioned on the surface of the table, on the upper surface of which the support is intended to be positioned, for the subsequent mounting of the printing plate on it.

The applicant observed that the presence of the layer of fabric, or breathable material, allows for the increase and intensification of the effect of the actuation of the vacuum generation system compared to what can be obtained with the solutions existing today.

This beneficial effect has been observed, specifically, also when using very thick supports (for example, 0.7 mm and more), and therefore considerably rigid and elastic.

Dependent claims refer to preferred and advantageous embodiments of the invention.

BRIEF DESCRIPTION OF THE DRAWINGS

These and further advantages will be better understood by any person skilled in the art from the following description and the attached drawings, given as a non-limiting example, in which.

EMBODIMENTS OF THE INVENTION

Figure 1:
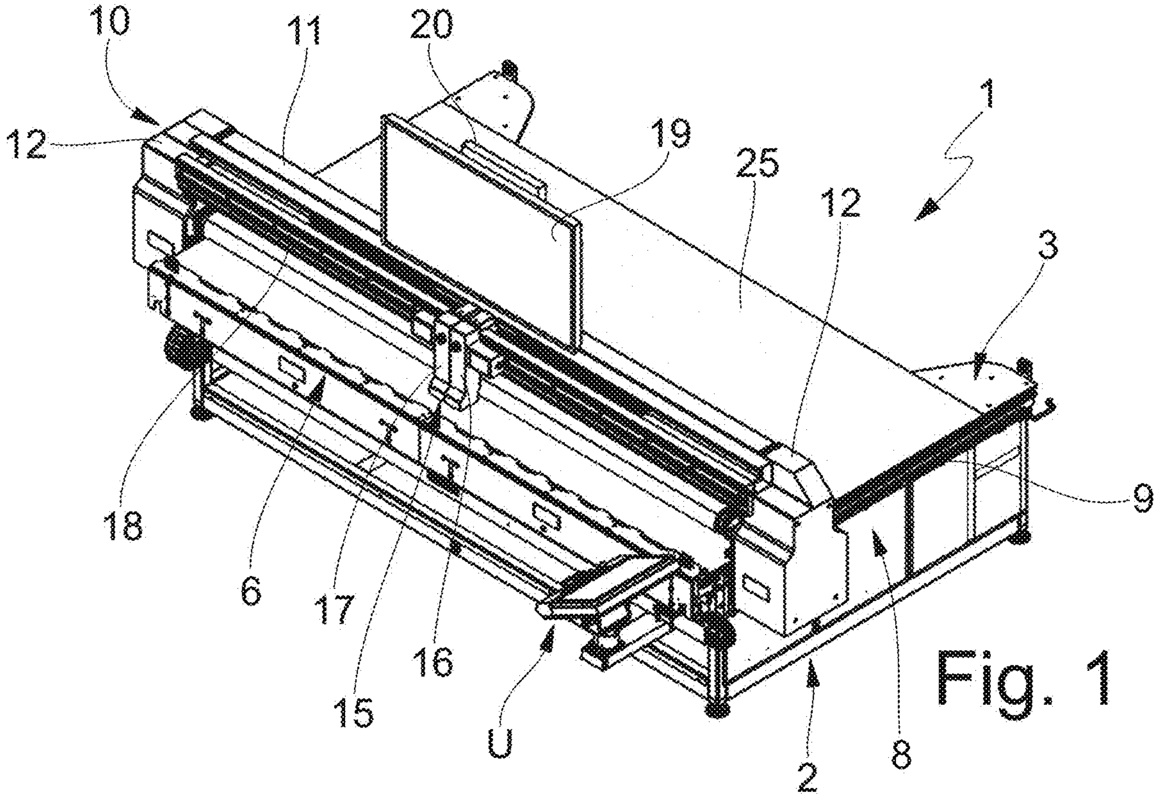
FIG. 1 is a schematic axonometric view of the machine according to the invention.
Figure 2:
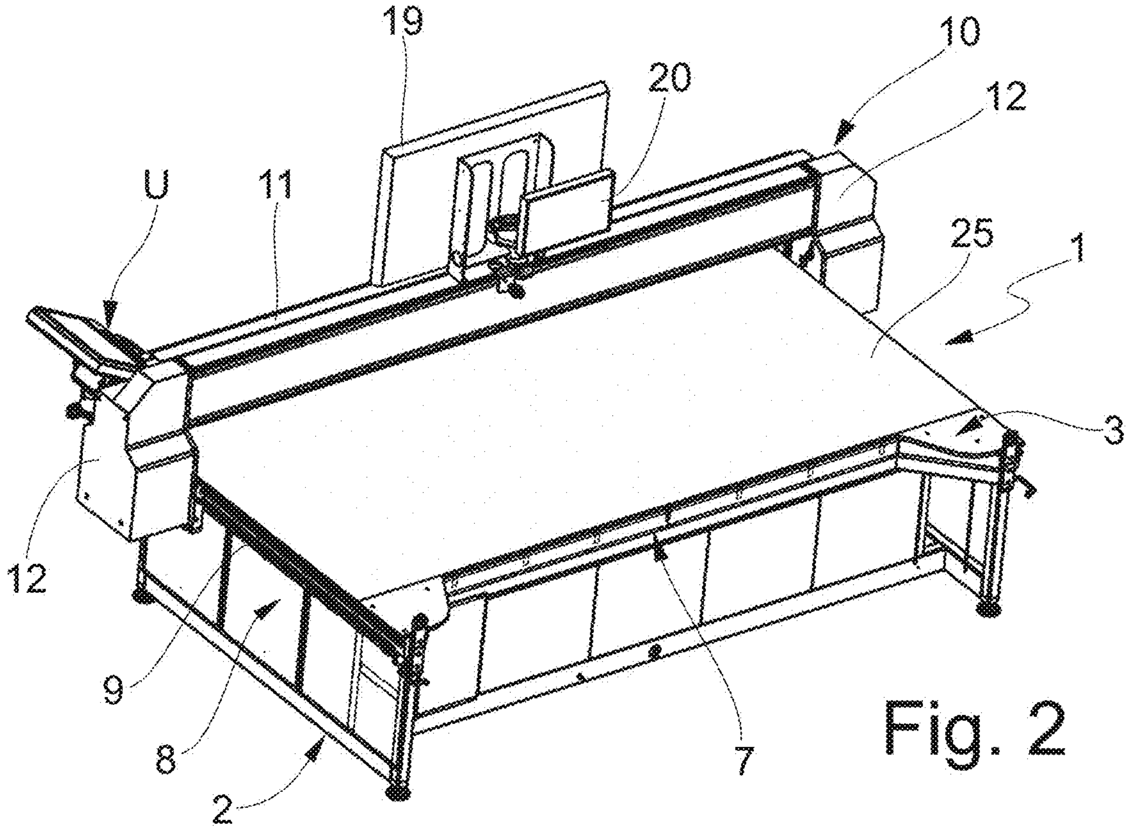
FIG. 2 is another axonometric view of the same machine, from a different angle.
Figure 3:
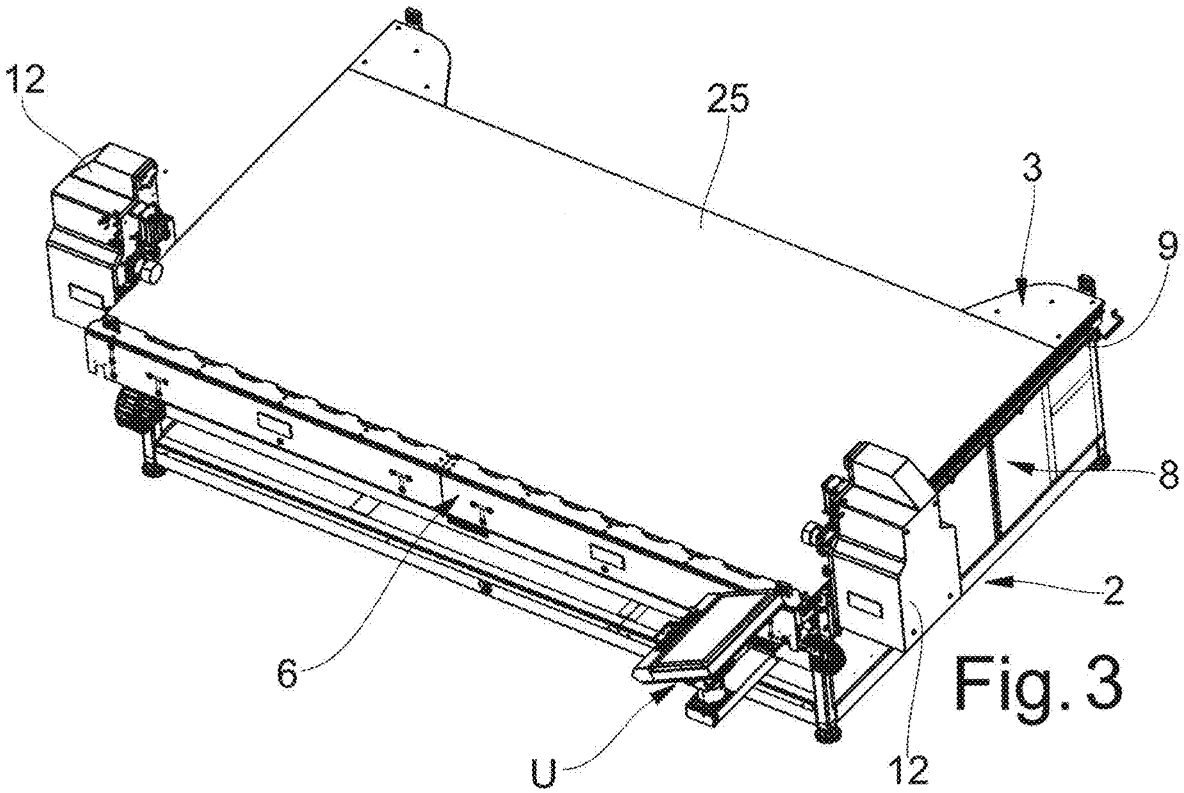
FIG. 3 is an isometric view of the machine, with the carriage removed for clarity.

With reference to FIGS. 1, 2, the numeral 1 generally indicates a machine for the flat mounting of flexographic printing plates according to the present invention.

Machine 1 has a base, indicated overall with 2.

The machine also includes a table 3, supported by the base 2.

Table 3 defines a support surface for mounting a printing plate 4 on a respective support 5 (for example made of Mylar, or other similar material), by interposing a double-sided adhesive material.

In more detail, on table 3 it is possible to position support 5, as well as printing plate 4 on the latter, in such a way as to superimpose the position references provided on printing plate 4 itself on corresponding crosses on the monitors of cameras 16, 17: this, therefore, allows checking the correct assembly of printing plate 4 on support 5.

Conventionally, and with reference to the normal conditions of use of machine 1, table 3 comprises a front side 6, a rear side 7, and two opposing sides 8.

Machine 1 also includes parallel lateral guides 9, which are provided along the sides 8 of table 3.

Machine 1 also includes a carriage 10.

The carriage 10 is engaged, in a sliding manner, in the aforementioned lateral guides 9.

Carriage 10 has a substantially portal or bridge structure.

Carriage 10 can, therefore, move over the entire surface of table 3.

Carriage 10 comprises, in more detail, a horizontal crosspiece 11 and two opposing vertical uprights 12, slidingly engaged in the lateral guides 9.

Carriage 10 supports, in a rotatable manner, at least one pressure roller 13.

The pressure roller 13 has the function of exerting a pressure of a predetermined amount on the surface of the printing plate 4, so that the latter adheres perfectly to the respective support 5 (thus also eliminating any air bubbles trapped between them).

Machine 1 comprises a vacuum generation system, indicated overall with 14 (FIG. 5), to constrain the support 5 to the surface of the table 3, during the assembly of the printing plate 4.

The machine 1 also comprises optical means, indicated overall by 15, for checking the mounting position of the printing plate 4 on the respective support 5.

In more detail, the optical means 15 comprise a first camera 16 and a second camera 17, suitable for checking the mounting position of respective references provided on the printing plate 4 with respect to corresponding references provided on the support 5.

The optical means 15 also comprise an upper guide 18, fixed to the carriage 10 (in correspondence with the front side 6 of the table 3), to which the first camera 16 and the second camera 17 are associated.

The first camera 16 and the second camera 17 can be moved along the upper guide 18 manually or automatically, by means of respective drive units.

The first camera 16 and the second camera 17 are movable in a direction perpendicular to that of the lateral guides 9 (and therefore in a transverse direction with respect to the table 3).

In use, the first camera 16 and the second camera 17 film, from above, respective pre-set mounting areas of the support 5, or of the printing plate 4.

The optical means 15 further comprise a central monitor 19, fixed to the carriage 10, to which the first camera 16 and the second camera 17 are operationally connected.

The central monitor 19 is visible to the operator when he is positioned at the front side 6 of the table 3.

The central monitor 19 allows the operator to view, enlarged, the images taken by the cameras 16, 17 themselves, in order to check/modify the positioning of the printing plate 4 with respect to the support 5.

The machine 1 also includes a user interface U for controlling and managing the entire operation; the user interface U is fixed to the table 3, or to the base 2, at the front side 5 of the table 3 itself.

The machine 1 may also include a second monitor 20, positioned opposite the central monitor 19 with respect to the carriage 10 (i.e., visible from the opposite side with respect to the central monitor 19, when the operator is located at the rear side 7).

The second monitor 20 allows the operator to view the images captured by the cameras 16, 17 even when working at the rear side 7 of the table 3.

It should be emphasized that all the movements of machine 1 (mainly those of the carriage 10, the pressure roller 13, the cameras 16, 17, etc.) can be manual or automated, managed by respective actuators operationally connected to the central control unit of machine 1.

Figure 4:
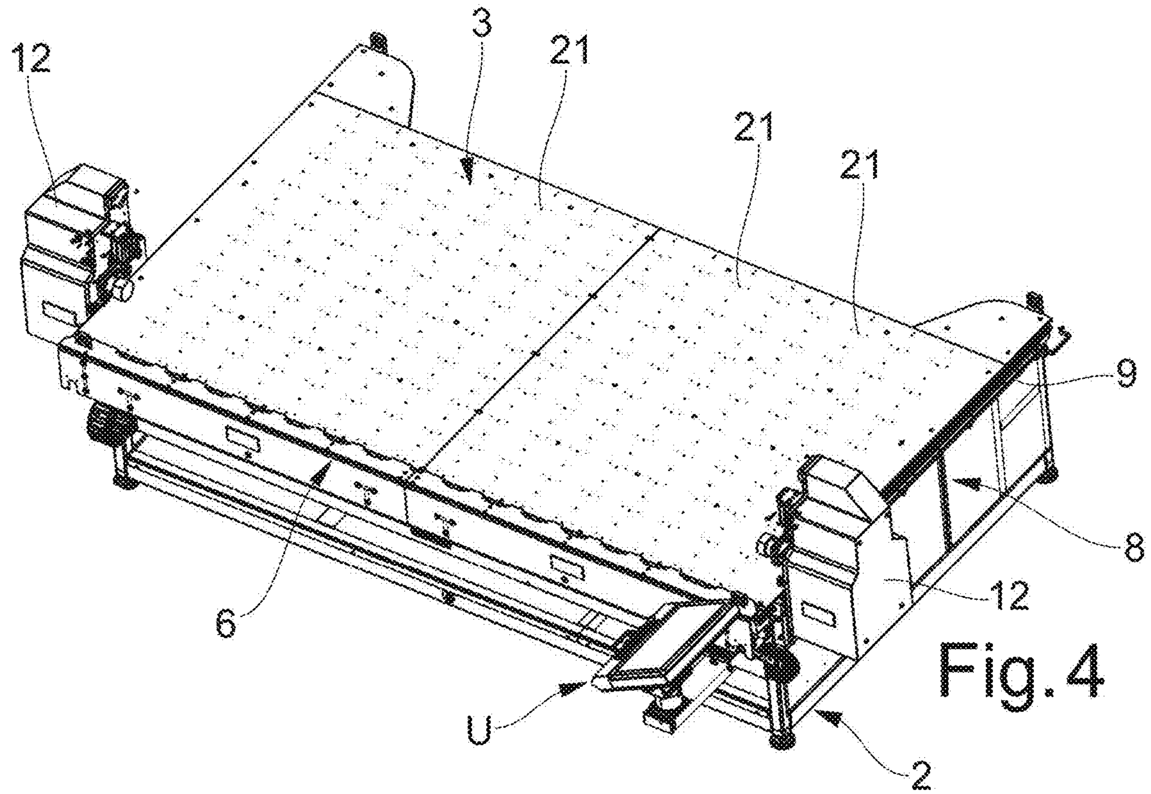
FIG. 4 is an isometric view of the machine with the carriage and layer of fabric, or breathable material, removed for clarity.
Figure 5:
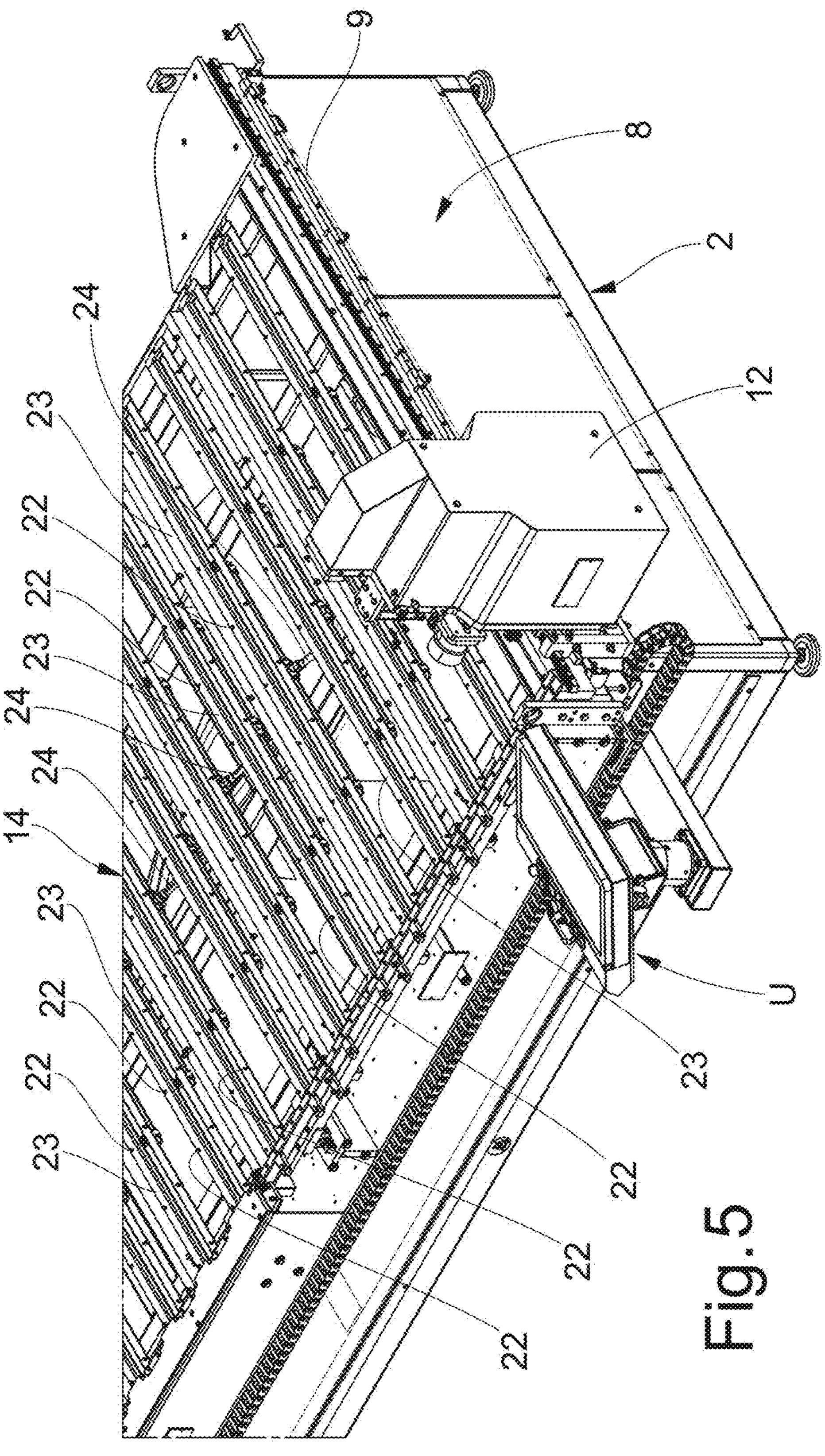
FIG. 5 is a detailed isometric view of the machine with the table removed for clarity.

With particular reference to FIGS. 4 and 5, the vacuum generation system 14 comprises a plurality of upper holes 21, which affect the table 3.

The upper holes 21 of the table 3 communicate with respective lower holes 22 provided in respective channels 23 positioned underneath the table 3.

The channels 23 are supported, parallel to each other, by the table 3, and they are arranged in such a way as to create a certain distribution of the lower holes 22, and therefore also of the upper holes 21, over the entire surface of the table 3.

The channels 23 are placed in communication—via respective ducts 24—with one or more pumps of the vacuum generation system 14, not visible in the attached figures.

According to one aspect of the invention, machine 1 comprises at least one layer of fabric 25 or breathable material, positioned on the surface of the table 3.

On the upper surface of the fabric layer 25, or breathable material, the support 5 is intended to be positioned, for the subsequent mounting, on it, of the printing plate 4.

Advantageously, and surprisingly, the applicant has observed that the layer of fabric 25, or breathable material, placed in direct contact with the surface of the table 3—and therefore with the upper holes 21 of the vacuum generation system 14—allows for a notable increase in the performance of the vacuum generation system 14 itself, and therefore its effectiveness in obtaining the adhesion of the support 5 to the surface of the layer of fabric 25, or breathable material, itself.

The layer of fabric 25, or breathable material, can be sized to cover the entire surface of the table 3, or possibly just a portion of it, depending on the specific usage requirements.

Furthermore, in accordance with another aspect of the invention, the fabric layer 25, or breathable material, is porous.

In more detail, the applicant observed that the porosity of the fabric layer 25, or breathable material, allows for the effect of the activation of the vacuum generation system 14 to be increased and intensified—in a very evident and therefore decisive way—compared to what can be obtained with the solutions existing to date.

This beneficial effect has been observed specifically when using very thick supports (e.g. 0.7 mm and above), which are therefore considerably rigid and elastic.

The fabric used to make layer 25, or breathable material, can be natural or synthetic.

For example, in a preferred, but not exclusive, embodiment of the invention, the fabric used to make the layer 25, or breathable material, may be of the woven pile type (such as carpet, or the like).

According to another aspect of the invention, the machine 1 comprises fastening means 26 of the layer of fabric 25, or breathable material, to the surface of the table 3.

The aforementioned fastening means 26—which prevent, in fact, any movement of the fabric layer 25, or breathable material, with respect to the table 3 itself—can be of any suitable type.

More specifically, in an embodiment of the invention of particular practical interest—and illustrated in the attached figures—the fastening means 26 comprise strips of double-sided tape 27, placed between the surface of the table 3 and the layer of fabric 25, or breathable material.

Figure 6:
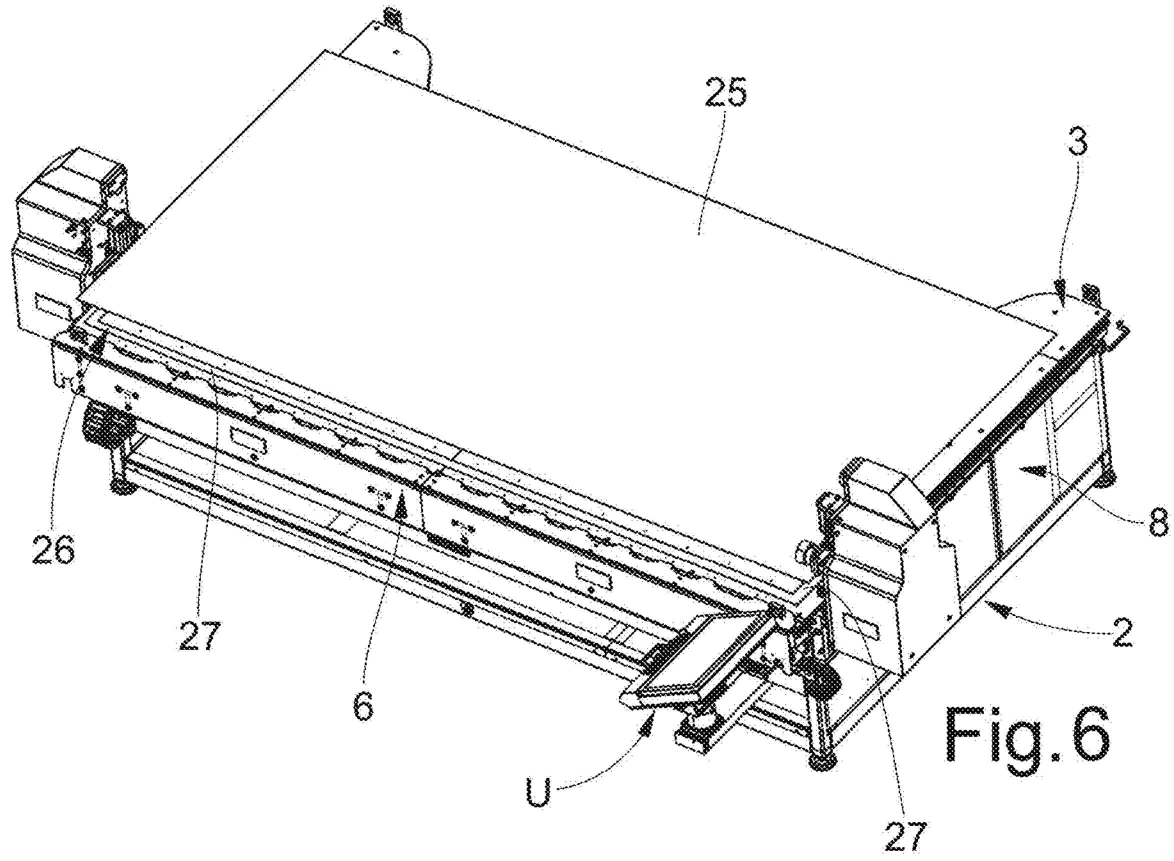
FIG. 6 is an isometric view of the machine with the carriage removed and the layer of fabric, or breathable material, lifted off the table.
Figure 7:
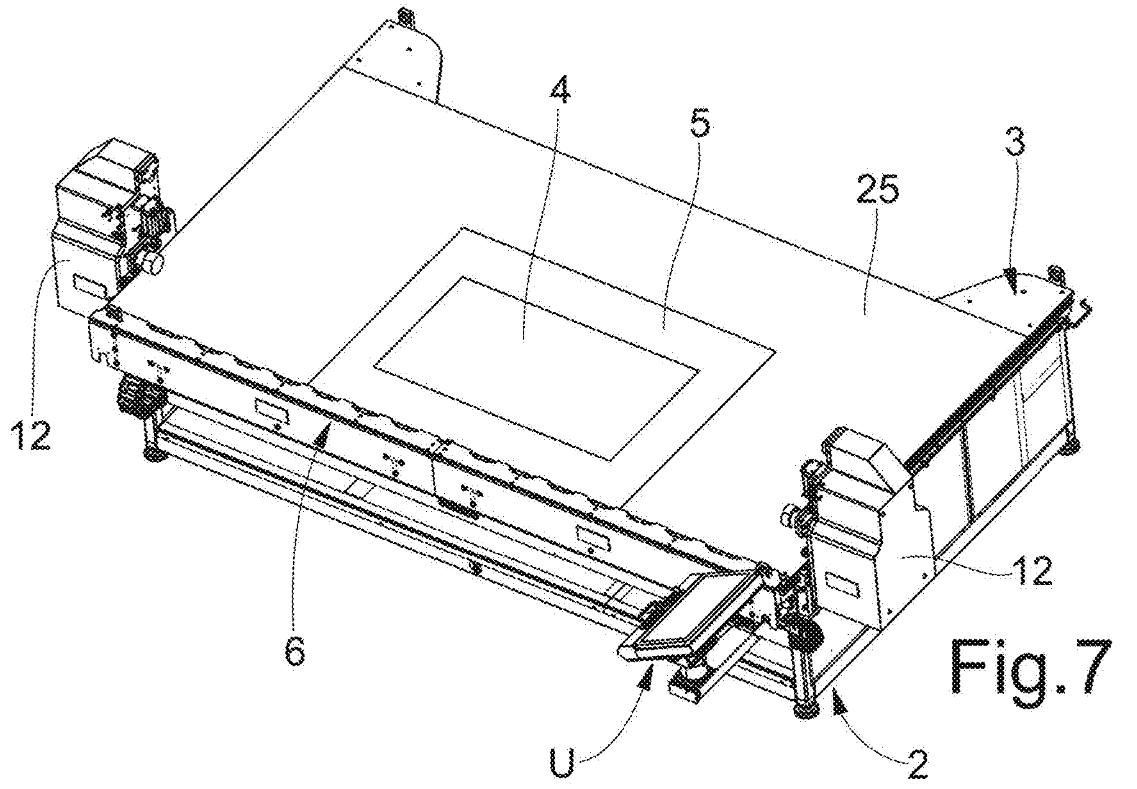
FIG. 7 is an axonometric view of the machine with the support, and the respective printing plate, positioned on the layer of fabric, or breathable material.
Figure 8:
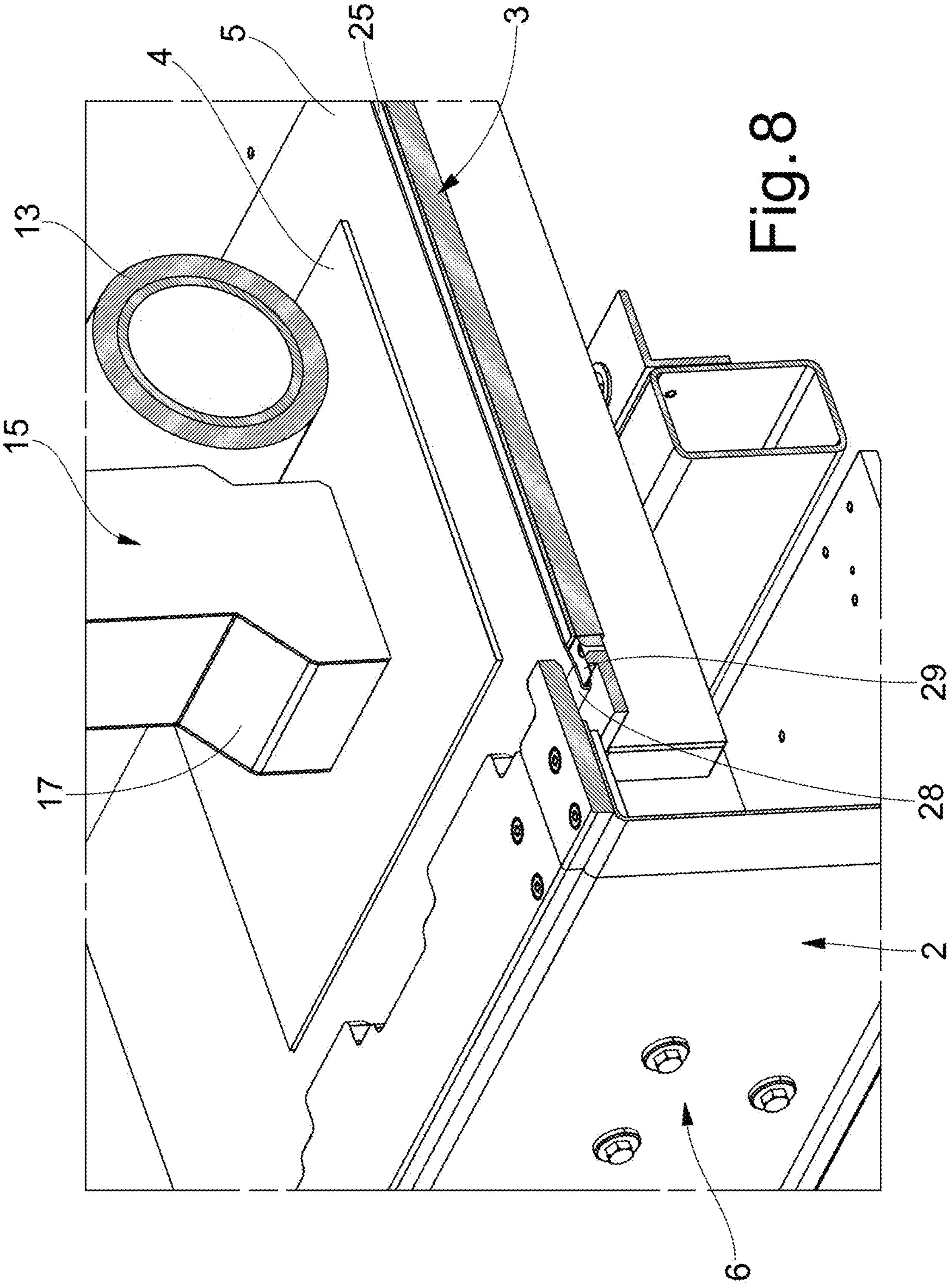
FIG. 8 is a detailed and sectioned axonometric view of the machine, with the support, and the respective printing plate, positioned on the layer of fabric, or breathable material.

For example—as shown in FIG. 6—the double-sided tape strips 27 can be positioned peripherally on the surface of the table 3, i.e. along its sides.

In an alternative embodiment, the fastening means 26 could comprise metal profiles fixed along the edges of the table 3, overlapping the end edges of the fabric layer 25, or breathable material.

The method of use and operation of the machine 1 according to the invention is, in light of what has been described, the following.

For better understanding, please refer to FIG. 6, which shows an enlarged section of the machine 1 according to the invention.

The support 5 is first positioned on the surface of the fabric layer 25, or breathable material; the positioning of the support 5 is facilitated by its folded terminal edge 28, which is hooked at a special profile 29 provided at the front side 6 of the machine 1.

Simultaneously with this positioning, or even before it, the vacuum generation system 14 of machine 1 is activated.

Thanks to the presence of the fabric layer 25, or breathable material, on the table 3 of the machine 1, surprisingly, the effect of the activation of the vacuum generation system 14 is increased and amplified, even in areas of the surface of the table 3 that are devoid of the upper holes 21.

Therefore, thanks to the presence of the fabric layer 25, or breathable material, the support 5 (even if of high thickness, for example 0.7 mm or more) remains perfectly adhered to the table 3 over its entire surface. At this point the printing plate 4 can be fixed on the surface of the support 5, with the interposition of double-sided tape (obviously, with the aid of the optical means 15).

Following this, and once the correct positioning of the printing plate 4 has been achieved, the pressure roller 13 of the carriage 10 is activated, in order to obtain perfect adhesion of the printing plate 4 on the support 5, and to eliminate any air bubbles trapped between the two parts.

Once assembly is complete, the vacuum generation system 14 can be deactivated, and the support 5, together with the printing plate 4, can be removed to be positioned on a printing cylinder.

It has thus been seen how the invention achieves the proposed objectives.

The solution according to the present invention allows for the effective and reliable mounting of a flexographic printing plate 4 on a respective Mylar support 5, even if the latter is of relatively high thickness (for example, 0.7 mm and above).

The support 5, even if relatively thick, remains stably attached to the table 3 of the machine 1 throughout the assembly phase, even, and above all, during the passages of the pressure roller 13.

This result is achieved, surprisingly, with a technically very simple and extremely economical solution, which can also be implemented on existing machines, without any limitations or impediments.

The present invention has been described according to preferred embodiments, but equivalent variants can be conceived without departing from the scope of protection offered by the following claims.

The invention claimed is:

1. A machine for flat mounting of flexographic printing plates, comprising:

a base, a table, supported by said base, defining a support plane for mounting a printing plate on a respective flat flexible support, said flat flexible support being configured to be applied in turn, together with the printed plate applied on said flat flexible support, to a printing cylinder, said table comprising a front side, a rear side and two opposing sides, parallel lateral guides, provided along said two opposing sides of said table, a carriage slidingly engaged in said parallel lateral guides, a pressure roller associated with said carriage, to determine adhesion of the printing plate on the respective support, a vacuum generation system, to constrain the respective support to a surface of the table, during mounting of the printing plate, at least one layer of fabric or breathable material, positioned on the surface of the table, on an upper surface of which the respective support is intended to be positioned, for subsequent mounting of a cliche on the respective support.

2. The machine according to claim 1, wherein said layer of fabric, or breathable material, is porous.

3. The machine according to claim 2, wherein said fabric, or breathable material, is natural or synthetic.

4. The machine according to claim 3, wherein said fabric, or breathable material, is of the woven pile type, such as carpet or the like.

5. The machine according to claim 1, comprising fastening means for attaching said layer of fabric, or breathable material, to the surface of said table.

6. The machine according to claim 5, wherein said fastening means comprise strips of double-sided tape, interposed between the surface of said table and said layer of fabric, or breathable material.

7. The machine according to claim 1, wherein said vacuum generation system comprises a plurality of upper holes, which affect said table.

8. The machine according to claim 7, wherein said upper holes of said table communicate with respective lower holes provided in respective channels positioned underneath said table.

9. The machine according to claim 8, wherein said channels are supported, parallel to each other, by said table, and are arranged so as to achieve a certain distribution of said lower holes, and therefore also of said upper holes, over the entire surface of said table.

10. The machine according to claim 9, wherein said channels are placed in communication, via respective ducts, with one or more pumps of said vacuum generation system.

* * * * *